(12) United States Patent
Kaidu et al.

(10) Patent No.: US 10,944,351 B2
(45) Date of Patent: Mar. 9, 2021

(54) MOTOR DRIVE CONTROL DEVICE AND MOTOR DRIVE CONTROL METHOD

(71) Applicant: MINEBEA MITSUMI Inc., Nagano (JP)

(72) Inventors: Hiroyuki Kaidu, Kakegawa (JP); Yuji Omura, Shizuoka (JP); Tomoyuki Suzuki, Kakegawa (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/633,251

(22) PCT Filed: Jun. 12, 2018

(86) PCT No.: PCT/JP2018/022472
§ 371 (c)(1),
(2) Date: Jan. 23, 2020

(87) PCT Pub. No.: WO2019/021663
PCT Pub. Date: Jan. 31, 2019

(65) Prior Publication Data
US 2020/0244207 A1 Jul. 30, 2020

(30) Foreign Application Priority Data

Jul. 28, 2017 (JP) .............................. JP2017-147006

(51) Int. Cl.
*H02P 6/14* (2016.01)
*H02P 27/08* (2006.01)
(Continued)

(52) U.S. Cl.
CPC .............. *H02P 27/08* (2013.01); *H02P 23/04* (2013.01); *H02P 25/22* (2013.01)

(58) Field of Classification Search
CPC ........... H02P 27/08; H02P 23/04; H02P 25/22
(Continued)

(56) References Cited

U.S. PATENT DOCUMENTS

| 4,622,500 A | 11/1986 | Budelman, Jr. |
| 2007/0024228 A1* | 2/2007 | Fujinaka ................... H02P 8/22 318/696 |

(Continued)

FOREIGN PATENT DOCUMENTS

| JP | 09-149654 A | 6/1997 |
| JP | 10-313591 A | 11/1998 |

(Continued)

OTHER PUBLICATIONS

International Preliminary Report on Patentability for corresponding International Application No. PCT/JP2018/022472 dated Jan. 28, 2020.

(Continued)

*Primary Examiner* — Erick D Glass
(74) *Attorney, Agent, or Firm* — Pearne & Gordon LLP

(57) ABSTRACT

A motor drive control device capable of reducing the occurrence of vibration in a simple circuit configuration is provided. The motor drive control device (1) includes a motor (Continued)

drive unit (2) that selectively energizes coils with a plurality of phases (Lu, Lv and Lw) of a motor (20) and a control circuit (4) that outputs a drive control signal (Sd) which is a PWM signal to the motor drive unit (2) and thereby controls driving of the motor (20) while switching energization phases of the coils with the plurality of phases (Lu, Lv and Lw) energized by the motor drive unit (2) in predetermined order. The control circuit (4) executes reduction control to temporarily reduce a duty ratio of the drive control signal (Sd) every time a period of 1/m (m is an integer of 2 or more) of a switching cycle of the energization phases elapses after switching the energization phases.

9 Claims, 6 Drawing Sheets

(51) Int. Cl.
*H02P 23/04* (2006.01)
*H02P 25/22* (2006.01)

(58) Field of Classification Search
USPC .................................................. 318/400.26
See application file for complete search history.

(56) References Cited

U.S. PATENT DOCUMENTS

| | | | | |
|---|---|---|---|---|
| 2010/0308764 | A1* | 12/2010 | Suzuki | H02P 29/032 318/494 |
| 2014/0105754 | A1* | 4/2014 | Endou | F04B 49/06 417/12 |
| 2016/0111984 | A1* | 4/2016 | Koizumi | B25F 5/00 318/400.22 |
| 2020/0244197 | A1* | 7/2020 | Ooba | H02M 7/53871 |

FOREIGN PATENT DOCUMENTS

| | | |
|---|---|---|
| JP | 2005-102430 A | 4/2005 |
| JP | 2011-055651 A | 3/2011 |
| JP | 2017-051013 A | 3/2017 |

OTHER PUBLICATIONS

English translation of the Written Opinion for corresponding International Application No. PCT/JP2018/022472 dated Aug. 7, 2018.
International Search Report for corresponding International Application No. PCT/JP2018/022472 dated Aug. 7, 2018.
Written Opinion for corresponding International Application No. PCT/JP2018/022472 dated Aug. 7, 2018.

* cited by examiner

MOTOR DRIVE CONTROL DEVICE AND MOTOR DRIVE CONTROL METHOD

TECHNICAL FIELD

The present invention relates to a motor drive control device and a motor drive control method, and particularly relates to a motor drive control device and a motor drive control method for driving a motor by switching energization to coils of the motor.

BACKGROUND ART

With a typical motor driven by switching energization to coils, when a frequency component of electromagnetic vibration generated by energization switching matches a natural frequency of the motor, this may lead to large vibration. In order to reduce influences of the electromagnetic vibration generated by energization switching of the motor, an operating rotational speed of which is determined, it is preferable to avoid a frequency component of electromagnetic vibration at the operating rotational speed from matching the natural frequency of the motor and avoid the occurrence of resonance. However, the above-described technique cannot be used for a motor such as an axial fan motor, a vibration peak value of which should be suppressed to a predetermined value or below within a wide rotational speed range between stoppage and a maximum rotational speed.

Patent Literature 1 describes a motor control device inhibiting the occurrence of noise based on vibration of a stator caused by resonance with the natural frequency of a motor. The motor control device according to Patent Literature 1 includes a rotational speed calculation unit that calculates a rotational speed of a rotor and a modulation factor adjustment unit that adjusts a modulation factor for an inverter based on the rotational speed calculated by the rotational speed calculation unit and the natural frequency of the stator. This motor control device prevents the occurrence of a resonance phenomenon caused by the frequency of a harmonic component and a natural frequency F of the stator and tries to suppress the occurrence of noise based on vibration of the stator.

DOCUMENT LIST

Patent Literature

Patent Literature 1: Japanese Patent Application Laid-Open Publication No. 2011-55651

SUMMARY OF INVENTION

Technical Problem

However, the motor control device described in Patent Literature 1 above needs to adjust the modulation factor for the inverter for each frequency of a PWM signal as in the case of 180-degree energization. Therefore, a microcontroller with a high processing capacity needs to be used, resulting in a problem that the manufacturing cost increases.

The present invention has been devised to solve the above problems and it is an object of the present invention to provide a motor drive control device and a motor drive control method capable of reducing the occurrence of vibration in a simple circuit configuration.

Solution to Problem

In order to attain the above described object, according to an aspect of the present invention, the motor drive control device includes a motor drive unit that selectively energizes coils with a plurality of phases of a motor and a control circuit that outputs a drive control signal which is a PWM signal to the motor drive unit and controls driving of the motor while switching energization phases of the coils with the plurality of phases energized by the motor drive unit in predetermined order, in which the control circuit executes reduction control to temporarily reduce a duty ratio of the drive control signal every time a period of $1/m$ (m is an integer of 2 or more) of a switching cycle of the energization phases elapses after switching the energization phases.

When performing reduction control, the control circuit preferably reduces the duty ratio of the drive control signal for a predetermined time.

When the rotational speed of the motor falls within a predetermined range, the control circuit preferably performs the reduction control.

The predetermined range preferably includes a rotational speed of the motor at which an n-th order component of electromagnetic vibration corresponding to the number n of energization switching per rotation of the rotor of the motor and a natural frequency of the motor produce a resonance phenomenon.

The control circuit preferably outputs the drive control signal while executing the reduction control and thereby generates electromagnetic vibration including an $(m \times n)$-th order component obtained by multiplying the number n of energization switching per rotation of the rotor of the motor by m.

The control circuit preferably executes reduction control when a period of ½ of the switching cycle elapses after switching the energization phases.

The control circuit preferably measures a time after the switching of the energization phases until the next switching of the energization phases every time the energization phases are switched and executes the reduction control by assuming the last measured time as the switching cycle.

The control circuit preferably includes a PWM commanding unit that sets a duty ratio of the drive control signal based on a position detection signal corresponding to the position of the rotor of the motor, an energization period monitoring unit that monitors an elapsed time after switching the energization phases based on the position detection signal and a set duty change instruction unit that outputs an instruction signal to the PWM commanding unit based on a monitoring result of the elapsed time after switching of the energization phases by the energization period monitoring unit and thereby temporarily causing the PWM commanding unit to reduce the duty ratio of the drive control signal.

According to another aspect of the present invention, a motor drive control method is provided for controlling driving of a motor using a motor drive control device provided with a motor drive unit that selectively energizes coils with a plurality of phases of the motor, outputting a drive control signal which is a PWM signal to the motor drive unit and switching energization phases of the coils with the plurality of phases energized by the motor drive unit in predetermined order, the method including a measuring step of measuring an elapsed time after switching the energization phases and a reduction control step of temporarily reducing a duty ratio of the drive control signal every time a period of $1/m$ (m is an integer of 2 or more) of a switching cycle of the energization phases elapses after switching the energization phases.

Effects of Invention

According to these inventions, it is possible to provide a motor drive control device and a motor drive control method capable of reducing the occurrence of vibration in a simple circuit configuration.

DESCRIPTION OF EMBODIMENTS

Hereinafter, a motor drive control device according to an embodiment of the present invention will be described.
[Embodiment]

Figure 1:
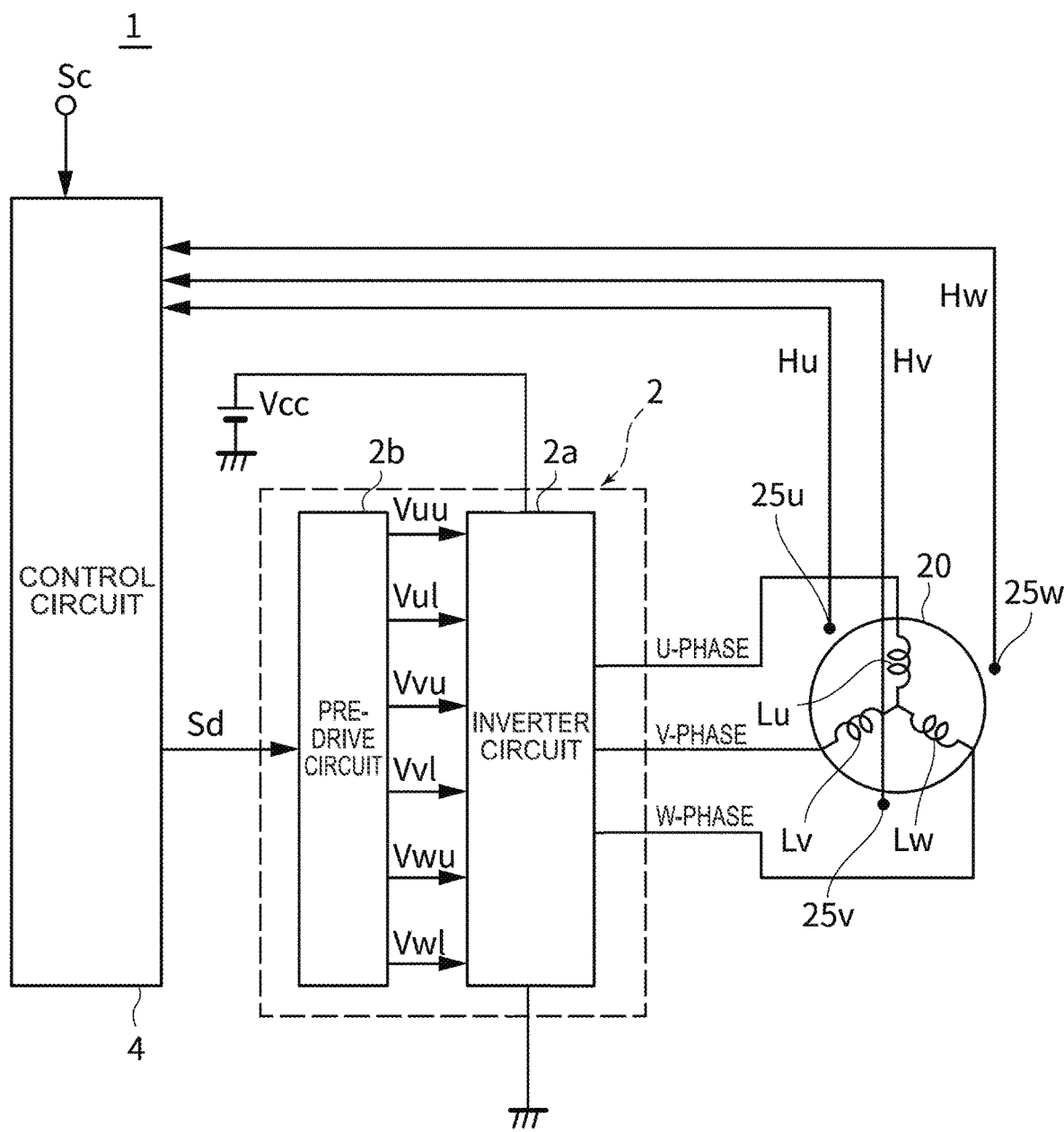
FIG. 1 A block diagram illustrating a circuit configuration of a motor drive control device according to one of embodiments of the present invention.

FIG. 1 is a block diagram illustrating a circuit configuration of a motor drive control device according to one of embodiments of the present invention.

As shown in FIG. 1, the motor drive control device 1 drives a motor 20. In the present embodiment, the motor 20 is a three-phase brushless motor. The motor drive control device 1 causes the motor 20 to rotate by periodically applying a drive current to the three-phase Lu, Lv, and Lw coils of the motor 20.

The motor drive control device 1 includes a motor drive unit 2 and a control circuit 4. Note that the components of the motor drive control device 1 illustrated in FIG. 1 are only some of all the components and the motor drive control device 1 may include other components in addition to the components shown in FIG. 1.

The motor drive control device 1 of the present embodiment is an integrated circuit device (IC), the whole of which is packaged. Note that part of the motor drive control device 1 may be packaged as one integrated circuit device, or one integrated circuit device may be formed by packaging the whole or a part of the motor drive control device 1 together with another device.

The motor drive unit 2 includes an inverter circuit 2a and pre-drive circuit 2b. The motor drive unit 2 outputs a drive signal to the motor 20 based on a drive control signal Sd outputted from the control circuit 4 to drive the motor 20. The motor drive unit 2 selectively energizes the coils with the plurality of phases Lu, Lv and Lw of the motor 20.

The pre-drive circuit 2b generates an output signal to drive the inverter circuit 2a based on the control by the control circuit 4 and outputs the output signal to the inverter circuit 2a. The inverter circuit 2a outputs a drive signal to the motor 20 based on the output signal outputted from the pre-drive circuit 2b to energize the coils Lu, Lv and Lw provided for the motor 20. The inverter circuit 2a is constructed, for example, of series circuit pair of two switching elements provided at both ends of a DC power supply Vcc arranged for each phase (U-phase, V-phase, W-phase) of the coils Lu, Lv and Lw. In each pair of two switching elements, terminals of the respective phases of the motor 20 are connected to connection points of the switching elements (not shown). The pre-drive circuit 2b outputs, for example, six types of signals Vuu, Vul, Vvu, Vvl, Vwu and Vwl corresponding to the respective switching elements of the inverter circuit 2a as output signals. When these signals Vuu, Vul, Vvu, Vvl, Vwu and Vwl are outputted, the switching elements corresponding to the respective signals Vuu, Vul, Vvu, Vvl, Vwu and Vwl perform ON/OFF operations. In this way, a drive signal is outputted to the motor 20 and currents flow through the coils with the respective phases Lu, Lv and Lw of the motor 20 (not shown).

In the present embodiment, a speed command signal Sc is inputted to the control circuit 4. The control circuit 4 performs drive control of the motor 20 based on those signals.

The speed command signal Sc is inputted, for example, from outside of the control circuit 4. The speed command signal Sc is a signal relating to the rotational speed of the motor 20. For example, the speed command signal Sc is a PWM (pulse width modulation) signal corresponding to the target rotational speed of the motor 20. In other words, the speed command signal Sc is information corresponding to a target value of the rotational speed of the motor 20. Note that a clock signal may also be inputted as the speed command signal Sc.

In the present embodiment, three Hall signals (examples of position detection signals) Hu, Hv and Hw are inputted to the control circuit 4 from the motor 20. The Hall signals Hu, Hv and Hw are, for example, outputs of the three Hall elements 25u, 25v and 25w arranged in the motor 20. The Hall signals Hu, Hv and Hw are signals corresponding to rotation of the rotor of the motor 20. The control circuit 4 detects a rotation state of the motor 20 using the Hall signals Hu, Hv and Hw and controls driving of the motor 20. That is, the control circuit 4 obtains information on the actual rotational frequency of the rotor of the motor 20 using the Hall signals Hu, Hv and Hw and controls driving of the motor 20. The control circuit 4 also detects the rotational position of the rotor of the motor 20 using the Hall signals Hu, Hv and Hw and controls driving of the motor 20.

The three Hall elements 25u, 25v and 25w (hereinafter, these three elements may be collectively called "hall element 25") are arranged around the rotor of the motor 20 at substantially equal intervals (at an interval of 120 degrees with the adjacent ones). The Hall elements 25u, 25v and 25w detect magnetic poles of the rotor and output the Hall signals Hu, Hv and Hw respectively.

Note that the control circuit 4 may also be configured to receive other information relating to the rotation state of the motor 20 in addition to or instead of the Hall signals Hu, Hv and Hw. For example, the control circuit 4 may also be configured to receive a signal generated using a coil pattern provided for the substrate on the rotor side (pattern FG) as an FG signal corresponding to the rotation of the rotor of the motor 20. The control circuit 4 may also be configured to detect the rotation state of the motor 20 based on a detection result of the rotational position detection circuit that detects a back electromotive force induced for each phase (U, V, W phase) of the motor 20. An encoder, a resolver or the like may also be provided so as to detect information on the rotational speed or the like of the motor 20.

The control circuit 4 is constructed of a microcomputer, a digital circuit or the like. The control circuit 4 outputs a drive control signal Sd to drive the motor 20 based on the information on the actual rotational frequency and the speed command signal Sc. More specifically, the control circuit 4 outputs the drive control signal Sd to the pre-drive circuit 2*b* based on the Hall signals Hu, Hv and Hw, and the speed command signal Sc. By outputting the drive control signal Sd, the control circuit 4 controls the rotation of the motor 20 so that the motor 20 rotates at the rotational frequency corresponding to the speed command signal Sc. That is, the control circuit 4 outputs the drive control signal Sd to drive the motor 20 to the motor drive unit 2 and controls the rotation of the motor 20. The motor drive unit 2 outputs a drive signal to the motor 20 based on the drive control signal Sd to drive the motor 20.

By outputting the drive control signal Sd which is a PWM (pulse width modulation) signal to the motor drive unit 2, the control circuit 4 controls driving of the motor while switching energization phases of the coils with the plurality of phases Lu, Lv and Lw energized by the motor drive unit 2 in predetermined order. More specifically, the motor 20 has three-phase coils Lu, Lv and Lw and includes six combinations of energization phases (energization patterns). The control circuit 4 switches among six energization patterns in predetermined order corresponding to the direction in which the motor 20 is rotated in accordance with phase changes in the Hall signals Hu, Hv and Hw.

[Description of Control Circuit 4]

Figure 2:
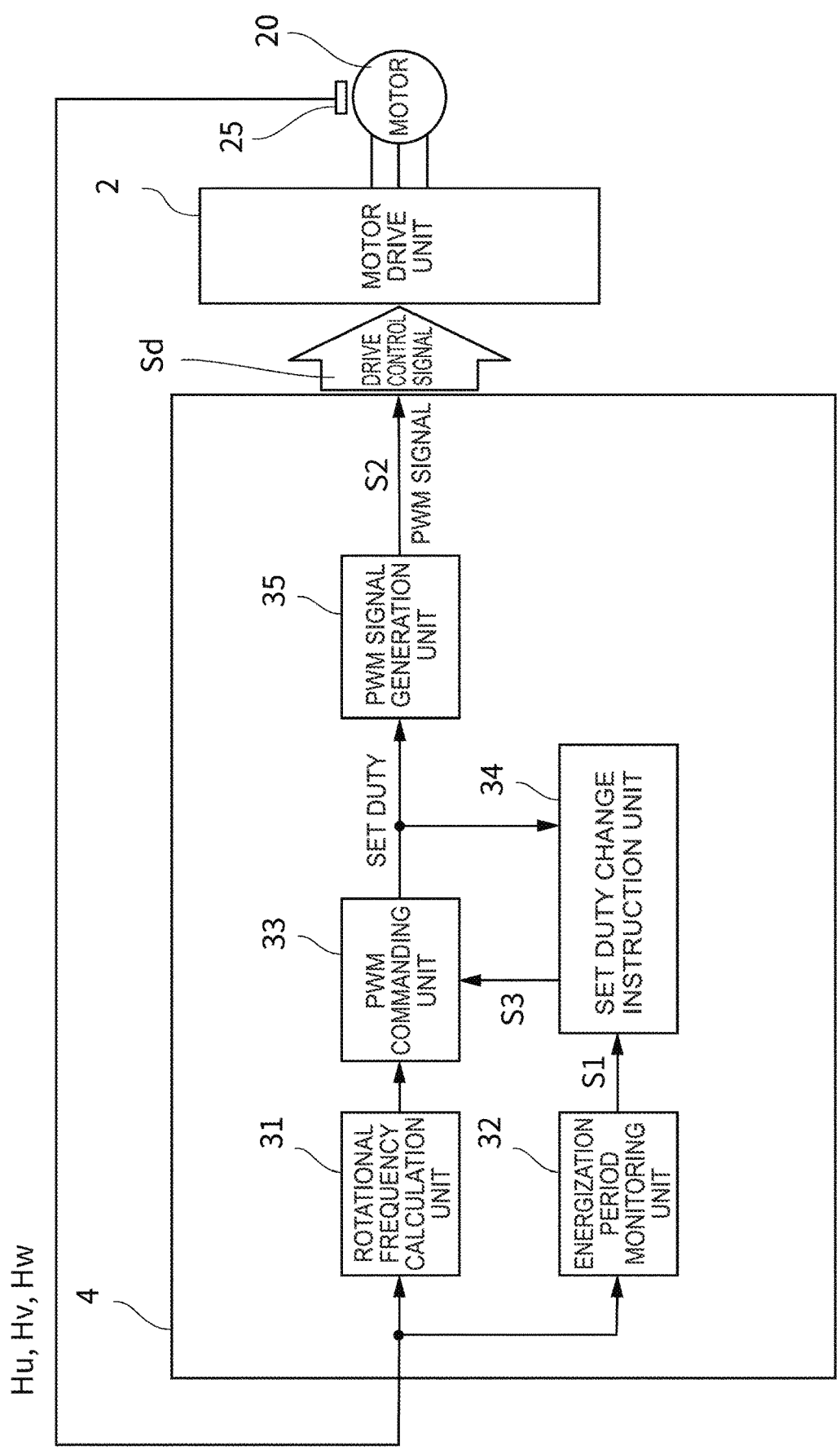
FIG. 2 A block diagram illustrating a configuration of a control circuit.

FIG. 2 is a block diagram illustrating a configuration of the control circuit 4.

As shown in FIG. 2, the control circuit 4 includes a rotational frequency calculation unit 31, an energization period monitoring unit 32, a PWM commanding unit 33, a set duty change instruction unit 34 and a PWM signal generation unit 35. Although details will be described later, the PWM commanding unit 33 sets a duty ratio of the drive control signal Sd based on the Hall signals Hu, Hv and Hw corresponding to the position of the rotor of the motor 20. The energization period monitoring unit 32 monitors an elapsed time after switching among the energization phases of the coils Lu, Lv and Lw (energization switching) based on the Hall signals Hu, Hv and Hw. The set duty change instruction unit 34 outputs a command signal to the PWM commanding unit 33 based on a monitoring result of the elapsed time after switching the energization phases by the energization period monitoring unit 32 and thereby causes the PWM commanding unit 33 to temporarily reduce the duty ratio of the drive control signal Sd.

With such a configuration, the control circuit 4 executes reduction control of temporarily reducing the duty ratio of the drive control signal Sd every time a period of 1/m (m is an integer of 2 or more) of the switching cycle of the energization phases elapses after switching among the energization phases of the coils Lu, Lv and Lw. In other words, the control circuit 4 executes a motor drive control method including a measuring step of measuring the elapsed time after switching the energization phases and a reduction control step of temporarily reducing a duty ratio of the drive control signal Sd every time a period of 1/m (m is an integer of 2 or more) of a switching cycle of the energization phase elapses after switching the energization phases.

Note that in the following description, the energization period refers to a period after the energization phases of the coils Lu, Lv and Lw are switched until the next energization phase is switched.

The Hall signals Hu, Hv and Hw are inputted to the rotational frequency calculation unit 31. The rotational frequency calculation unit 31 generates and outputs information on the actual rotational frequency of the rotor based on the inputted Hall signals Hu, Hv and Hw. That is, the rotational frequency calculation unit 31 outputs the information on the actual rotational frequency of the rotor of the motor 20.

The PWM commanding unit 33 receives the information on the actual rotational frequency outputted from the rotational frequency calculation unit 31 and the speed command signal Sc (not shown) as input. The PWM commanding unit 33 outputs a set duty based on the information on the actual rotational frequency and the speed command signal Sc. The set duty is a signal indicating the duty ratio for outputting the drive control signal Sd. The PWM commanding unit 33 generates the set duty based on, for example, the speed command signal Sc and the information on the actual rotational frequency so that the rotational speed of the motor 20 corresponds to the speed command signal Sc. That is, the PWM commanding unit 33 sets the duty ratio of the drive control signal Sd based on the Hall signals Hu, Hv and Hw corresponding to the position of the rotor of the motor 20. Note that the set duty is outputted in correspondence with the energization phase to be energized. That is, the set duty is outputted so that energization is performed in an energization pattern corresponding to the rotor position based on the Hall signals Hu, Hv and Hw. For example, the rotational frequency calculation unit 31 generates a signal indicating the rotor position based on the Hall signals Hu, Hv and Hw and the PWM commanding unit 33 outputs the set duty corresponding to the energization phase to be energized according to the signal.

The set duty is outputted to the PWM signal generation unit 35 and the set duty change instruction unit 34. The PWM signal generation unit 35 generates a PWM signal S2 to drive the motor drive unit 2 based on the inputted set duty. The PWM signal S2 is, for example, a signal where the duty ratio becomes equal to the set duty. In other words, the PWM signal S2 is a signal having a duty ratio corresponding to the set duty. When the motor drive control device 1 and the motor 20 are driven in a normal operating state, the PWM signal S2 outputted from the PWM signal generation unit 35 is outputted from the control circuit 4 to the motor drive unit 2 as the drive control signal Sd. Thus, a drive signal is outputted from the motor drive unit 2 to the motor 20 and the motor 20 is driven. The energization phases of the coils Lu, Lv and Lw are switched according to the rotor position based on the Hall signals Hu, Hv and Hw.

The Hall signals Hu, Hv and Hw are inputted to the energization period monitoring unit 32. The energization period monitoring unit 32 monitors the elapsed time after the energization phases of the coils Lu, Lv and Lw are switched based on the Hall signals Hu, Hv and Hw. In the present embodiment, when the energization phases are switched, the energization period monitoring unit 32 ends the measurement of the energization period (first energization period) dt1 so far and starts measurement of an energization period (second energization period) dt2 after the switching as will be described later. The first energization period dt1 is the time corresponding to a time for which ⅙ of electric angle 360 degrees elapses. The second energization period dt2 is an elapsed time after the current energization period starts.

The energization period monitoring unit 32 outputs the control timing signal S1 based on the monitoring result for the elapsed time after switching among the energization phases. The control timing signal S1 is a signal to perform the aforementioned reduction control and is inputted to the set duty change instruction unit 34. The energization period monitoring unit 32 outputs the control timing signal S1 every time a period of 1/m (m is an integer of 2 or more) of the switching cycle of the energization phases elapses after switching among the energization phases. Assuming the first energization period dt1 as the switching cycle of the energization phases, the energization period monitoring unit 32 outputs the control timing signal S1 every time a period of 1/m of the first energization period dt1 elapses after the measurement start of the second energization period dt2. That is, the control circuit 4 measures the time after switching among the energization phases until the next switching among the energization phases every time the energization phases are switched and executes reduction control every time a period of 1/m of the first energization period dt1 elapses assuming the first energization period dt1 which is the time measured during the last energization period as the switching cycle.

In the present embodiment, when a period of ½ of the switching cycle of energization phases elapses after switching among the energization phases, the energization period monitoring unit 32 outputs the control timing signal S1 and the control circuit 4 executes reduction control. That is, m is 2 in the present embodiment. When a half period of the first energization interval dt1 elapses after switching among the energization phases, the energization period monitoring unit 32 outputs the control timing signal S1.

Note that the energization period monitoring unit 32 outputs the control timing signal S1 for each energization period every time a period of 1/m of the first energization period dt1 elapses until the number of times the control timing signal S1 is outputted reaches m minus 1 times. That is, when, for example, m is 3, if a period of ⅓ of the first energization period dt1 elapses after switching among the energization phases, the first control timing signal S1 is outputted during the energization period. When the period of ⅓ of the first energization period dt1 further elapses after the first output of the control timing signal S1, the control timing signal S1 is outputted for the second time in the energization period. Then, even when the period of ⅓ of the first energization period dt1 further elapses after the second output of the control timing signal S1, the control timing signal S1 is not outputted for the energization period. Since m is 2 in the present embodiment, the control timing signal S1 is outputted only once.

When the control timing signal S1 is outputted in this way, the set duty change instruction unit 34 performs control so that the duty ratio of the set duty is reduced. The duty ratio of the drive control signal Sd outputted from the control circuit 4 is thereby temporarily reduced.

That is, when the control timing signal S1 is inputted, the set duty change instruction unit 34 outputs a set duty change instruction signal (an example of instruction signal) S3 to the PWM commanding unit 33. The set duty change instruction signal S3 is a signal to instruct the PWM commanding unit 33 to change the duty ratio of the set duty. In the present embodiment, the set duty change instruction signal S3 is a signal to instruct the PWM commanding unit 33 to switch the duty ratio of the set duty to a low level and return the duty ratio to the original duty ratio.

The set duty change instruction unit 34 monitors the set duty outputted from the PWM commanding unit 33. When outputting the set duty change instruction signal S3 and instructing to switch the duty ratio of the set duty to a lower ratio, the set duty change instruction unit 34 returns the duty ratio of the set duty to the original ratio based on the monitoring result. When outputting the set duty change instruction signal S3 and instructing to switch the duty ratio of the set duty to a lower ratio, the set duty change instruction unit 34 outputs the set duty change instruction signal S3 again and thereby instructs to return the duty ratio of the set duty to the original ratio.

Note that in the present embodiment, when performing reduction control, the control circuit 4 reduces the duty ratio of the drive control signal Sd for a predetermined time. That is, when outputting the set duty change instruction signal S3 and instructing to switch the duty ratio of the set duty to a low ratio, the set duty change instruction unit 34 confirms that the duty ratio has actually been changed to a lower ratio and returns the duty ratio of the set duty to the original ratio when a predetermined time elapses after then.

When the set duty change instruction signal S3 is inputted, the PWM commanding unit 33 outputs a set duty, the duty ratio of which is lower than at a normal time (when no reduction control is performed). After then, when the set duty change instruction signal S3 is inputted, a set duty of the original duty ratio is outputted.

The duty ratio of the set duty outputted by the PWM commanding unit 33 is set so that the motor 20 is driven at a rotational speed corresponding to the speed command signal Sc at a normal time as described above. On the other hand, when the set duty change instruction signal S3 is outputted, the PWM commanding unit 33 sets the duty ratio of the set duty to, for example, 0 percent. Note that the duty ratio of the set duty when reduction control is performed is not limited to 0 percent. For example, the duty ratio of the set duty may also be set to on the order of 5 percent which is lower than at the normal time. Moreover, the duty ratio of the set duty may also be set to a duty ratio which is lower, by a predetermined rate, than the duty ratio of the set duty at the normal time.

Figure 3:
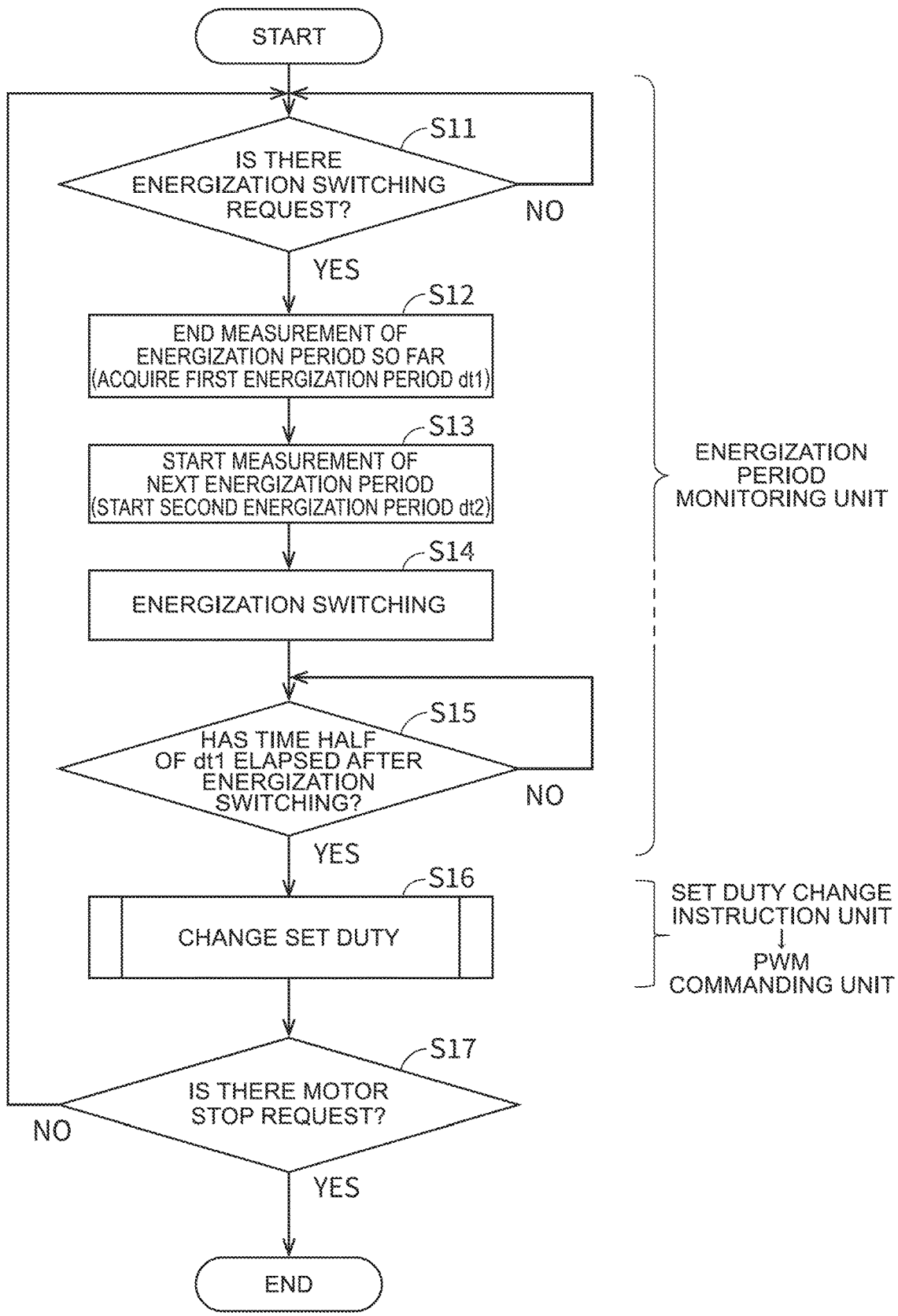
FIG. 3 A flowchart illustrating operation of the control circuit.

FIG. 3 is a flowchart illustrating operation of the control circuit 4.

Of operations carried out by the control circuit 4, FIG. 3 shows processes relating to reduction control in particular.

While driving the motor 20, the control circuit 4 determines, in step S11, whether or not there is an energization switching request. The energization period monitoring unit 32 determines, when timing at which the energization phases of the coils Lu, Lv and Lw should be switched comes, that there is an energization switching request, based on the Hall signals Hu, Hv and Hw. When the energization period monitoring unit 32 determines that there is an energization switching request (YES), the flow proceeds to step S12. On the other hand, when the energization period monitoring unit 32 does not determine that there is an energization switching request (NO), the process in step S11 is repeated.

In step S12, the energization period monitoring unit 32 ends the measurement of the energization period so far. Thus, the energization period monitoring unit 32 acquires the first energization period dt1 for the immediately preceding energization period.

In step S13, the energization period monitoring unit 32 starts the next energization period. That is, the energization period monitoring unit 32 starts measurement of the second energization period dt2.

In step S14, the control circuit 4 switches the energization phases of the coils Lu, Lv and Lw according to an energization period switching request.

In step S15, the energization period monitoring unit 32 determines whether or not ½ of the switching cycle of the energization phase elapses after switching the energization phases. More specifically, after switching the energization phases, the energization period monitoring unit 32 determines whether or not half of the first energization period dt1 which is the immediately preceding energization period elapses. Such a determination can be made based on the first energization period dt1 and the second energization period dt2 under measurement. When it is determined that half of the first energization period dt1 has elapsed (YES), the flow proceeds to step S16. At this time, the control timing signal S1 is outputted from the energization period monitoring unit 32 to the set duty change instruction unit 34. On the other hand, when it is not determined that half of the first energization period dt1 has elapsed (NO), the process in step S15 is repeated.

In step S16, a set duty change process is performed. The set duty change process is mainly performed by the set duty change instruction unit 34 and the PWM commanding unit 33.

In step S17, the control circuit 4 determines whether or not there is a motor stop request for stopping driving of the motor 20. When there is a motor stop request (YES), the control circuit 4 ends a series of processes. At this time, driving of the motor 20 is stopped. On the other hand, when there is no motor stop request (NO), the process returns to step S11.

Figure 4:
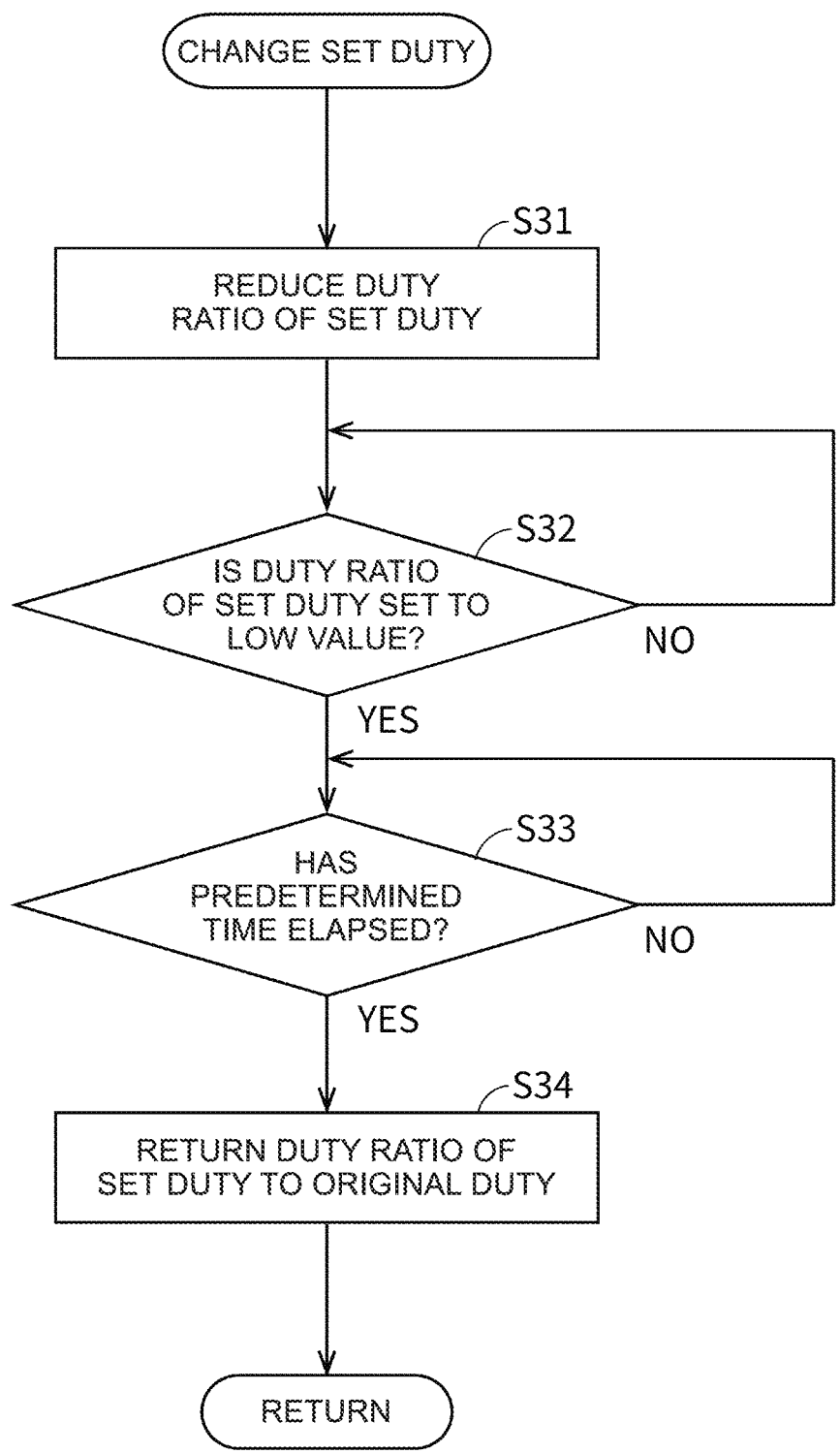
FIG. 4 A flowchart illustrating a set duty change process.

FIG. 4 is a flowchart illustrating a set duty change process.

When the set duty change process starts, the control circuit 4 reduces the duty ratio of the set duty in step S31. That is, the set duty change instruction unit 34 outputs the set duty change instruction signal S3. Thus, the PWM commanding unit 33 outputs a set duty, a duty ratio of which is lower than the duty ratio at a normal time.

In step S32, the set duty change instruction unit 34 monitors the set duty outputted from the PWM commanding unit 33 and determines whether or not the duty ratio of the set duty becomes a low value. When the duty ratio of the set duty becomes a low value (YES), the flow proceeds to step S33. On the other hand, when the duty ratio of the set duty does not become a low value (NO), the process in step S32 is repeated.

In step S33, the set duty change instruction unit 34 determines whether or not a predetermined time has elapsed. The set duty change instruction unit 34 determines, for example, whether or not the predetermined time has elapsed from a point in time at which the duty ratio of the set duty becomes a low value. Note that the set duty change instruction unit 34 may also determine whether or not a predetermined time has elapsed from a point in time at which the set duty change instruction signal S3 is outputted. When it is determined that the predetermined time has elapsed (YES), the flow proceeds to step S34. On the other hand, when it is not determined that the predetermined time has elapsed (NO), the process in step S33 is repeated.

In step S34, the set duty change instruction unit 34 performs control to return the duty ratio of the set duty to the original ratio. That is, the set duty change instruction unit 34 outputs the set duty change instruction signal S3. In this way, the PWM commanding unit 33 outputs a set duty of the duty ratio at a normal time.

When the control circuit 4 performs reduction control in this way, electromagnetic vibration including a higher frequency component is generated compared to the case where no reduction control is performed.

Figure 5:
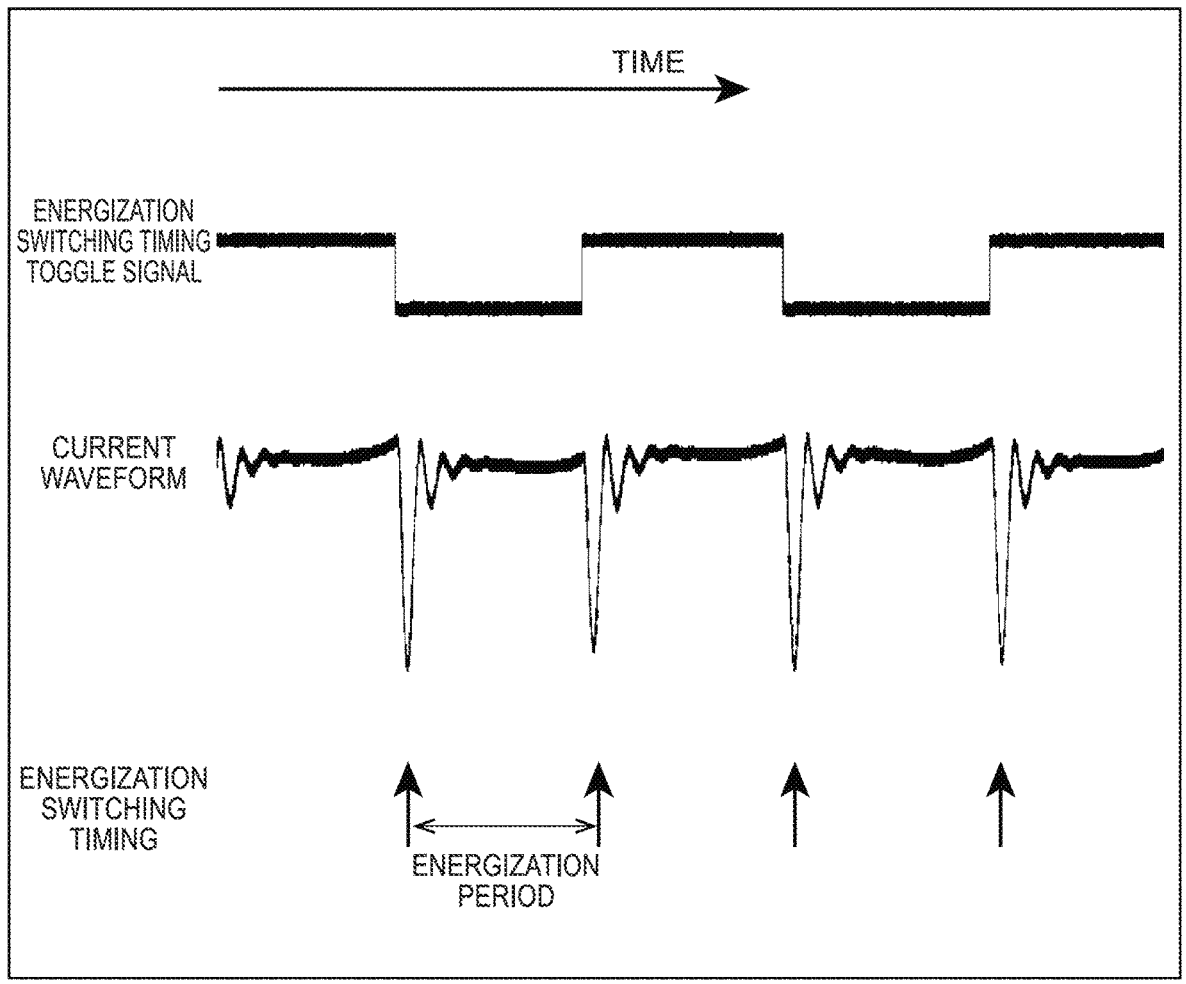
FIG. 5 A diagram illustrating a waveform of drive current of the motor when reduction control is not in progress.
Figure 6:
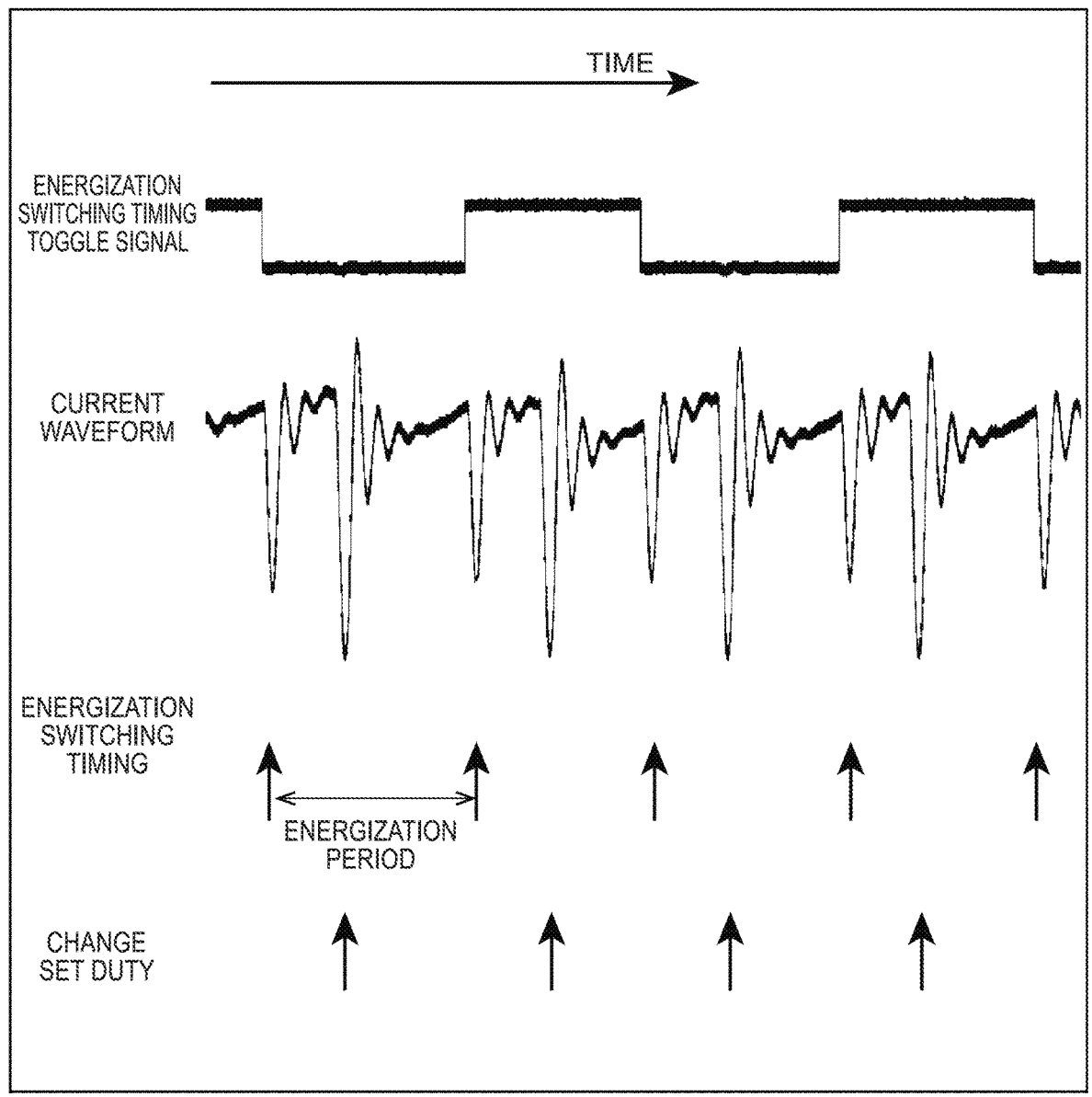
FIG. 6 A diagram illustrating a waveform of drive current of the motor when reduction control is in progress.

FIG. 5 is a diagram illustrating a waveform of drive current of the motor 20 when reduction control is not in progress. FIG. 6 is a diagram illustrating a waveform of drive current of the motor 20 when reduction control is in progress.

FIG. 5 and FIG. 6 illustrate waveforms of drive current of the motor 20, and illustrate an energization switching timing toggle signal and switching timings of energization phases with upward arrows together with the waveforms. In FIG. 6, timings at which the duty ratio of the set duty is changed to a lower value are further shown by upward arrows. In the energization switching timing toggle signal, energization phases are switched at timings at which high and low levels are switched.

As shown in FIG. 5, the drive current of the motor 20 temporarily drastically decreases at timing at which energization phases are switched and is then returned to the original magnitude. Therefore, the drive current is lowered periodically every time energization phases are switched. For this reason, when no reduction control is performed, electromagnetic vibration with a high frequency component corresponding to the cycle in which energization phases are switched is generated.

On the other hand, when reduction control is performed, the waveform of drive current of the motor 20 is as shown in FIG. 6. That is, the drive current of the motor 20 temporarily decreases at timing at which energization phases are switched in the same way as in FIG. 5. Furthermore, reduction control is performed as described above and the duty ratio of the set duty temporarily decreases, and therefore the drive current of the motor 20 temporarily decreases after the energization phases are switched until energization phases are switched next time. For this reason, in electromagnetic vibration generated when reduction control is performed, the frequency component of a frequency corresponding to 1/m (½ in FIG. 6) of the cycle in which energization phases are switched increases.

In the case of electromagnetic vibration generated when reduction control is performed, a frequency component having a frequency m times as high as the frequency at which the frequency component increases when no reduction control is performed increases. That is, the control circuit 4 outputs a drive control signal Sd while performing reduction control and thereby generates electromagnetic vibration including (m×n)-th order component which is order obtained by multiplying an energization switching count n per rotation (electric angle 360 degrees) of the rotor of the motor 20 by m. When the energization switching count per rotation of the rotor of the motor 20 is 12, if reduction control is performed as in the case of the present embodiment, electromagnetic vibration including a 24-th order component corresponding to 12 multiplied by 2 is generated.

As described above, the control circuit 4 in the present embodiment performs reduction control by outputting a set duty change instruction signal S3 based on the last cycle of the energization period every time a period of 1/m of the cycle elapses. Therefore, it is possible to shift the frequency component of electromagnetic vibration to a high frequency band so that the frequency of the natural frequency of the motor 20 does not overlap the frequency of the frequency component of the electromagnetic vibration and thereby prevent resonance with a large vibration force from occurring. That is, while the generation factor of the electromagnetic vibration component is the n-th order component corresponding to the energization switching count n per rotation of the rotor, the electromagnetic vibration having the (m×n)-th order component can be generated by performing the reduction control. Therefore, it is possible to prevent, in an inexpensive configuration, resonance with the motor natural frequency from occurring within a predetermined rotational speed range. It is possible to lower the vibration value of the electromagnetic vibration component overlapping the frequency of the natural frequency of the motor 20 by adjusting the value of m as appropriate and consequently avoid large vibration from occurring. That is, the motor drive control device 1 and the motor drive control method of the present embodiment can reduce the occurrence of vibration in a simple circuit configuration.

Note that the control circuit 4 may be configured to perform reduction control when the rotational speed of the motor 20 falls within a predetermined range. That is, the control circuit 4 may be configured to perform reduction control when the rotational speed of the motor 20 falls within a predetermined range in which the electromagnetic vibration and the natural frequency of the motor 20 are likely to produce a resonance phenomenon if no reduction control is performed. The predetermined range is a range including the rotational speed of the motor 20 in which the n-th order component of the electromagnetic vibration corresponding to the energization switching count n per rotation of the rotor of the motor 20 and the natural frequency of the motor 20 produce a resonance phenomenon. In this case, when the rotational speed of the motor 20 does not fall within a predetermined range during the energization period of the motor 20, no reduction control is performed or the set duty is not changed to a low duty either, and the motor 20 can thereby be driven efficiently.

[Others]

The motor drive control device is not limited to the circuit configuration shown in the above-described embodiment or modification of the embodiment. Various circuit configurations configured to achieve the object of the present invention are applicable.

In reduction control, the predetermined time for temporarily reducing the duty ratio of the set duty may be changed in accordance with the rotational speed of the motor 20. For example, when the motor 20 is driving at high speed, the predetermined time may be shortened so that the duty ratio of the set duty is immediately returned to the duty ratio at a normal time. The predetermined time may be a fixed value. Alternatively, the predetermined time may be a momentary time. That is, in the set duty change process, when it is confirmed that the duty ratio of the set duty outputted from the PWM commanding unit becomes a low value, the duty ratio of the set duty may be immediately returned to the value at the normal time.

In the set duty change process, after control of reducing the duty ratio of the set duty is performed, the set duty outputted from the PWM commanding unit may not be monitored. In this case, the PWM commanding unit may perform a process of returning the duty ratio of the set duty to the value at the normal time based on other conditions (e.g., that a predetermined time has elapsed after the set duty change instruction signal is outputted or the like).

The energization phase switching cycle, which becomes a reference for the energization period monitoring unit to output a control timing signal is not limited to the last energization period. An average of past energization periods for a predetermined period may be adopted as the energization phase switching cycle or a predetermined time may be adopted as the energization phase switching cycle. The energization phase switching cycle may be calculated in accordance with a speed command signal or information on the actual rotational frequency of the motor.

At least some of the respective components of the motor drive control device may be processes not by hardware but by software.

The motor driven by the motor drive control device according to the present embodiment is not limited to a brushless motor but may also be motors of other types. The number of magnetic poles or the number of slots of the motor are not particularly limited.

The number of phases of the motor is not limited to 3. The number of Hall elements is not limited to 3. The position detector may use means different from the Hall elements so as to obtain a position detection signal of the motor. For example, a Hall IC or the like may be used or the motor may be driven under a so-called sensor-less scheme without using any sensor to detect the position of the rotor.

The aforementioned flowchart or the like is intended to show an example to describe operation and the present invention is not limited to this. The steps shown in the respective drawings of the flowcharts are specific examples and the steps are not limited to this flow, and, for example, the order of steps can be changed or other processes may be inserted between the respective steps or processes may be parallelized.

Some or all of the processes in the above-described embodiment may be implemented by software or using a hardware circuit. For example, the control circuit is not limited to a microcontroller. As for an internal configuration of the control circuit, at least part of the configuration may be processed by software.

It should be noted that all the aspects of the above-described embodiment are exemplary, but are not restrictive. The scope of the present invention is indicated not by the foregoing description but by the scope of claims, and all the changes in the meaning and within a scope equivalent to the scope of claims are meant to be included.

LIST OF REFERENCE SIGNS

1 motor drive control device
2 motor drive unit
4 control circuit
6 current detection unit
20 motor
25 (25$u$, 25$v$, 25$w$) Hall element
31 rotational frequency calculation unit
32 energization period monitoring unit
33 PWM commanding unit
34 set duty change instruction unit
35 PWM signal generation unit
Hu, Hv, Hw Hall signal (an example of position detection signal)
Lu, Lv and Lw coil
S1 control timing signal
S3 set duty change instruction signal (an example of command signal)
Sc speed command signal
Sd drive control signal

The invention claimed is:

1. A motor drive control device comprising:
a motor drive unit that selectively energizes coils with a plurality of phases of a motor; and
a control circuit that outputs a drive control signal which is a PWM signal to the motor drive unit and controls driving of the motor while switching energization phases of the coils with the plurality of phases energized by the motor drive unit in predetermined order, wherein
the control circuit executes reduction control to temporarily reduce a duty ratio of the drive control signal every time a period of $1/m$ (m is an integer of 2 or more) of a switching cycle of the energization phases elapses after switching the energization phases, and wherein the control circuit comprises:

a PWM commanding unit that sets the duty ratio of the drive control signal based on a position detection signal corresponding to a position of a rotor of the motor;

an energization period monitoring unit that monitors an elapsed time after switching the energization phases based on the position detection signal; and a set duty change instruction unit that outputs an instruction signal to the PWM commanding unit based on a monitoring result of the elapsed time after switching of the energization phases by the energization period monitoring unit and thereby temporarily causing the PWM commanding unit to reduce the duty ratio of the drive control signal.

2. The motor drive control device according to claim 1, wherein the control circuit reduces the duty ratio of the drive control signal for a predetermined time.

3. The motor drive control device according to claim 1, wherein when a rotational speed of the motor falls within a predetermined range, the control circuit performs the reduction control.

4. The motor drive control device according to claim 3, wherein the predetermined range includes the rotational speed of the motor at which an n-th order component of electromagnetic vibration corresponding to a number n of energization switching per rotation of the rotor of the motor and a natural frequency of the motor produce a resonance phenomenon.

5. The motor drive control device according to claim 1, wherein the control circuit outputs the drive control signal while executing the reduction control and thereby generates electromagnetic vibration including an (m×n)-th order component obtained by multiplying a number n of energization switching per rotation of the rotor of the motor by m.

6. The motor drive control device according to claim 1, wherein the control circuit executes the reduction control when a period of ½ of the switching cycle elapses after switching the energization phases.

7. The motor drive control device according to claim 1, wherein the control circuit measures a time after the switching of the energization phases until the next switching of the energization phases every time the energization phases are switched and executes the reduction control by assuming the last measured time as the switching cycle.

8. A motor drive control method for controlling driving of a motor using a motor drive control device comprising a motor drive unit that selectively energizes coils with a plurality of phases of the motor, outputting a drive control signal which is a PWM signal to the motor drive unit and switching energization phases of the coils with the plurality of phases energized by the motor drive unit in predetermined order, the method comprising:

a PWM commanding step of setting a duty ratio of the drive control signal based on a position detection signal corresponding to a position of a rotor of the motor;

an energization period monitoring step of monitoring an elapsed time after switching the energization phases based on the position detection signal; and a reduction control step of temporarily reducing the duty ratio of the drive control signal every time a period of 1/m (m is an integer of 2 or more) of a switching cycle of the energization phases elapses after switching the energization phases, wherein the reduction control step includes a set duty change instruction step of outputting an instruction signal based on a monitoring result of the elapsed time after switching of the energization phases at the energization period monitoring step and thereby temporarily reducing the duty ratio of the drive control signal at the PWM commanding step.

9. A motor drive control device comprising:

a motor drive unit that selectively energizes coils with a plurality of phases of a motor; and a control circuit that outputs a drive control signal which is a PWM signal to the motor drive unit and controls driving of the motor while switching energization phases of the coils with the plurality of phases energized by the motor drive unit in predetermined order, wherein the control circuit executes reduction control to temporarily reduce a duty ratio of the drive control signal every time a period of 1/m (m is an integer of 2 or more) of a switching cycle of the energization phases elapses after switching the energization phases, wherein when a rotational speed of the motor falls within a predetermined range, the control circuit performs the reduction control, and wherein the predetermined range includes the rotational speed of the motor at which an n-th order component of electromagnetic vibration corresponding to a number n of energization switching per rotation of a rotor of the motor and a natural frequency of the motor produce a resonance phenomenon.

* * * * *